H. D. HAMILTON & J. GOODMAN.
DEMOUNTABLE RIM.
APPLICATION FILED DEC. 17, 1917.

1,302,156.

Patented Apr. 29, 1919.
2 SHEETS—SHEET 1.

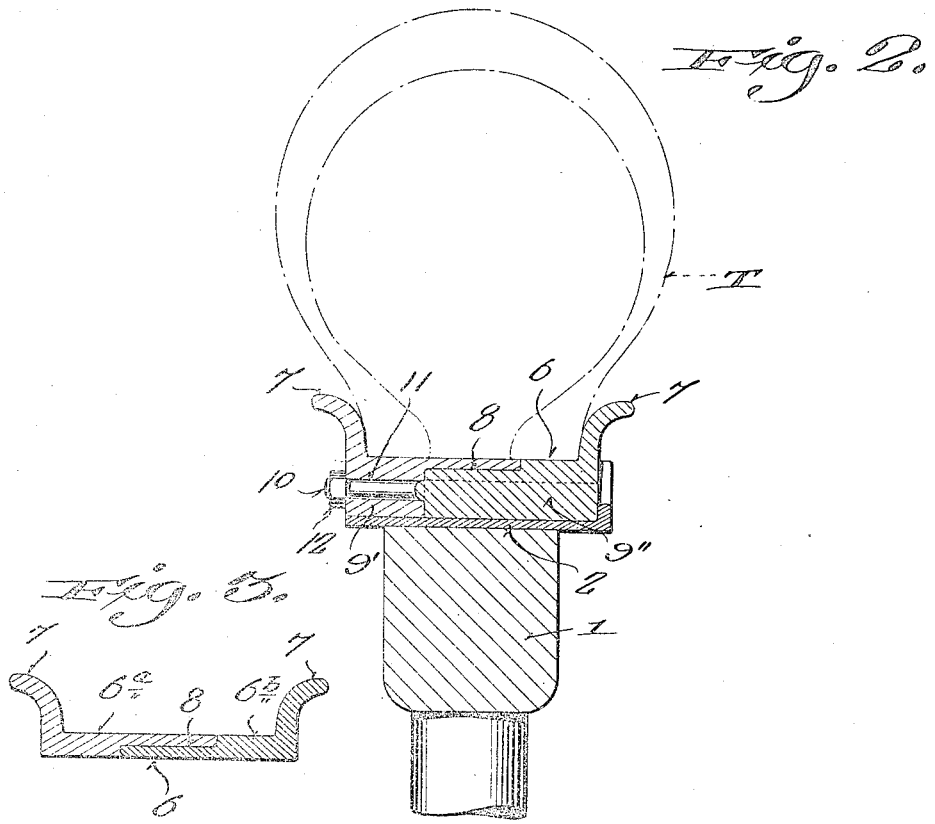
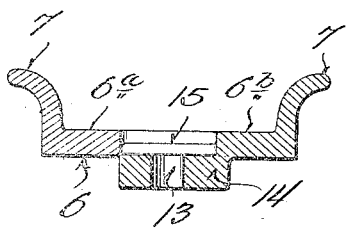

UNITED STATES PATENT OFFICE.

HARRY D. HAMILTON, OF KENOSHA, AND JULIUS GOODMAN, OF RACINE, WISCONSIN.

DEMOUNTABLE RIM.

1,302,156.  Specification of Letters Patent.  Patented Apr. 29, 1919.

Application filed December 17, 1917. Serial No. 207,495.

*To all whom it may concern:*

Be it known that we, HARRY D. HAMILTON and JULIUS GOODMAN, both citizens of the United States, and residents of Kenosha, in the county of Kenosha and State of Wisconsin, and of Racine, in the county of Racine and State of Wisconsin, respectively, have invented certain new and useful Improvements in Demountable Rims; and we do hereby declare that the following is a full, clear, and exact description thereof.

Our invention relates to new and useful improvements in demountable vehicle rims, particularly those which are adapted for use on automobiles and similar self propelled vehicles.

Although there are many forms of demountable rims at present in use, practically all are more or less unsatisfactory as they are difficult to remove from the vehicle wheels, and even when removed it is extremely difficult to separate the tires therefrom. It is therefore an important object of this invention to provide a rim which will not only be readily demountable, but one which will also be separable to permit the tire to be easily slipped on or off as desired.

An object subordinate to the principal object is to provide an improved, yet simple arrangement for holding the two sections of the separable rim together.

Still another object is to provide means for preventing the rim from creeping circumferentially about the felly of the wheel.

With these and other objects in view which will become evident as the description progresses our invention resides in the novel features of construction, combination and arrangement of parts which will be hereinafter more particularly described and claimed.

In the accompanying drawings:

Fig. 2 is a transverse sectional view taken on the plane of the line 2—2 of Fig. 1.

Figure 1:
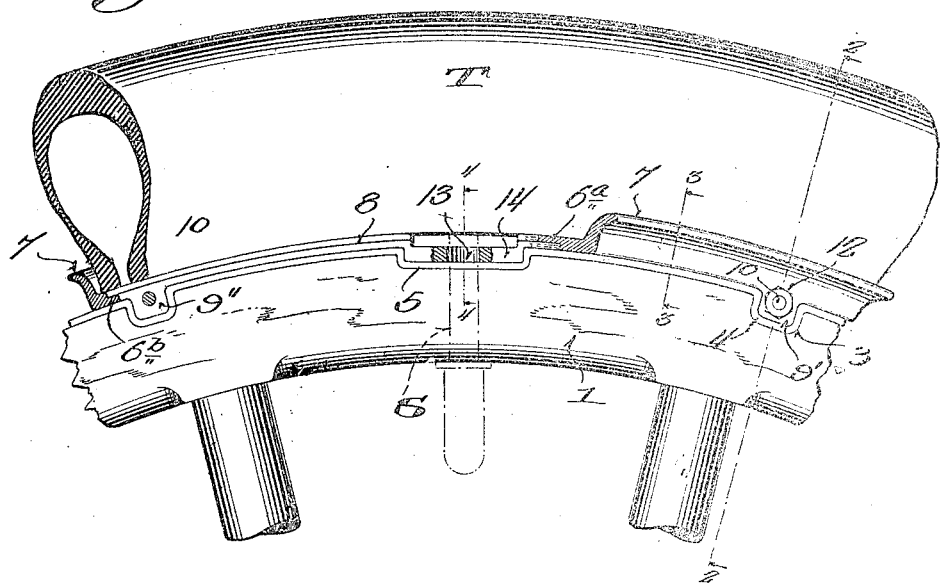
Figure 1 represents a side elevational view of a fragment of a vehicle wheel having a portion of a tire held thereon by our improved rim, the latter being broken away and in section.
Figure 5:
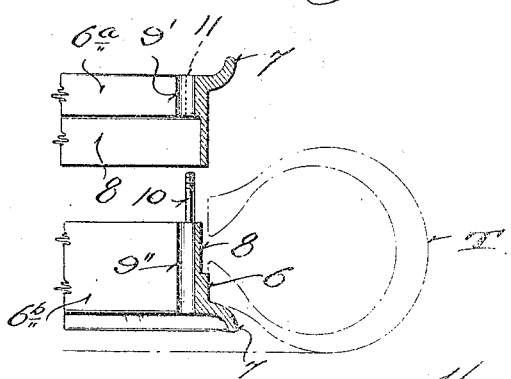

Figs. 3 and 4 are similar views on the planes of the lines 3—3 and 4—4 of Fig. 1, and Fig. 5 is a detail transverse sectional view of the two sections of the rim arranged in juxtaposition to illustrate the manner in which the tire is disposed on said rim.

Referring more particularly to the several figures of the drawings it will be seen that the numeral 1 denotes the felly of a vehicle wheel of conventional design having a metallic reinforcing strip 2 on its outer annular surface as is customary in devices of this character. The outer annular surface of the felly is formed at intervals with transversely extending channels 3, and the reinforcing strip 2 at these points is bent inwardly as at 4. The felly and the reinforcing strip are also provided with a relatively wide channel 5 at a point surrounding the opening for the usual valve stem S as will be hereinafter more particularly described.

The demountable separable rim which is to be removably disposed on this felly 1 consists of a band 6 formed of two overlapping parts $6^a$ and $6^b$ and engageable on the felly band, the outer annular edge of each part having an annular flange 7 for engaging the walls of a tire T. These flanges 7 may be either of the straight-side or clencher type depending upon the form of tire which is to be used on the rim. Fig. 3 shows very clearly the manner in which the parts $6^a$ and $6^b$ of the band are overlapped, the overlapped portion of each being reduced in thickness, the reduction on one part being on the opposite side from that of the other as shown at 8. This reduction extends outwardly from the inner edge and an equal distance on each part, thus when the rim is assembled it will be the same thickness throughout its width and both inner and outer annular surfaces will be unbroken.

At predetermined points on the inner annular surface of the rim are cast a number of transversely extending ribs, each of these ribs being formed of two parts 9′ and 9″ which are alined when the two sections or parts $6^a$ and $6^b$ of the rim are properly disposed with respect to each other. As will appear from Fig. 1 these transverse ribs depend from the band 6 and are disposed in the transversely extending channels formed in the felly 1 and reinforcing strip 2. It is obvious that such ribs when so arranged in the channels of the felly band will prevent all tendency of circumferential creeping of the demountable rim on the vehicle wheel.

The transverse ribs are also designed to aid in holding the two sections of the rim together. The preferred arrangement is shown clearly in Figs. 2 and 5 wherein it will be noted that the parts 9" of the ribs have stub bolts 10 extending therefrom, while the parts 9' are provided with longitudinally extending apertures 11 to receive the bolts. The length of said bolts is such that their free ends extend beyond the outer ends of the parts 9' of the rim to receive nuts 12.

Inasmuch as that this improved rim is primarily designed for use in connection with pneumatic tires, the rim 6 is designed to permit the valve stem S to extend therethrough, and hence the reduced portion 8 of the section 6$^b$ of the rim is provided with a hole 13 surrounding which is a reinforcing plate 14 preferably formed integrally with the under surface of the band, this plate 14 being adapted to seat in the channel 5 when the rim is on the felly. Adjacent the opening 13 and the plate 14 both parts 6$^a$ and 6$^b$ of the band 6 are cut away as at 15 in Fig. 4.

In applying a tire to our improved rim before mounting the same on a wheel, the two parts 6$^a$ and 6$^b$ are separated, the section 6$^b$ being then disposed on the ground with its inner edge extending upwardly as in Fig. 5, whereupon the tire T can be readily disposed therearound. The other part or section 6$^a$ is then placed over the section 6$^b$ in such a manner that the stub bolts 10 project into the openings 11. After applying the nuts 12 to the ends of said bolts the rim and its tire may be disposed upon the felly as hereinbefore mentioned.

It will be noted that owing to the fact that the lap joint at the rim body between the parts 6$^a$ and 6$^b$ is to one side of the center, there is no liability of pinching the inner tube at the center of the rim. It will also be observed that, as the rim beads 7, 7, are thus separated, crowding of the beads over these rims under the ordinary method of inserting a tire is avoided and this crowding of the beads which heretofore has tended to mutilate the same, is entirely eliminated as there are no obstructions offered in inserting the casing.

We claim:—

In a structure of the class described, a two-part separable rim, the inner side portion of the rim parts being cutaway on opposite peripheral faces and overlapped, said lapped portions extending substantially equal distances from the center of the rim, a series of transverse wheel engaging ribs on the inner periphery of that rim part which is cutaway on its outer peripheral portion, said ribs extending throughout the entire width of the rim part, a series of transverse ribs on the other rim part extending from its outer edge to its cutaway portion and in alinement with the first named ribs, said second named series of ribs being of consequently lesser length than the first named ribs, and connecting bolts extending rigidly from the first named series of ribs and passed through the second named series of ribs.

In testimony that we claim the foregoing we have hereunto set our hands at Milwaukee, in the county of Milwaukee and State of Wisconsin.

HARRY D. HAMILTON.
JULIUS GOODMAN.